US012794043B2

(12) United States Patent
Sivanesaselvam et al.

(10) Patent No.: US 12,794,043 B2
(45) Date of Patent: Nov. 10, 2026

(54) BATTERY MODULE WITH A CELL HOLDER ASSEMBLY

(71) Applicant: TVS MOTOR COMPANY LIMITED, Chennai (IN)

(72) Inventors: Thangarajan Sivanesaselvam, Chennai (IN); Subbiah Senthilnathan, Chennai (IN); Dhinagar Samraj Jabez, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 909 days.

(21) Appl. No.: 17/920,877

(22) PCT Filed: Apr. 23, 2021

(86) PCT No.: PCT/IN2021/050400
§ 371 (c)(1),
(2) Date: Oct. 24, 2022

(87) PCT Pub. No.: WO2021/214794
PCT Pub. Date: Oct. 28, 2021

(65) Prior Publication Data
US 2023/0170551 A1 Jun. 1, 2023

(30) Foreign Application Priority Data
Apr. 24, 2020 (IN) ............................. 202041017540

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 50/213* (2021.01); *H01M 50/291* (2021.01);
(Continued)

(58) Field of Classification Search
CPC ........... H01M 10/0587; H01M 10/613; H01M 10/617; H01M 10/643; H01M 10/6554;
(Continued)

(56) References Cited

U.S. PATENT DOCUMENTS

2015/0188203 A1* 7/2015 Enomoto ............ H01M 10/613 429/83
2016/0172727 A1* 6/2016 Chan ................... H01M 10/613 429/120
2018/0294536 A1 10/2018 Kruszelnicki

FOREIGN PATENT DOCUMENTS

DE 10352046 A1 6/2005
JP 2005285454 * 10/2005
(Continued)

OTHER PUBLICATIONS

International Search Report issued in corresponding International Application No. PCT/IN2021/050400 mailed Aug. 23, 2021 (3 pages).
(Continued)

*Primary Examiner* — Matthew W Van Oudenaren
(74) *Attorney, Agent, or Firm* — Osha Bergman Watanabe & Burton LLP

(57) ABSTRACT

A battery module for a powered device includes: a casing that includes a top cover and a bottom cover; cells disposed between the top cover and the bottom cover; and a cell holder assembly comprising cell holders that accommodate the cells. The cell holder assembly includes an inlet manifold and an outlet manifold that enable a coolant to flow through the cell holders sequentially from the inlet manifold to the outlet manifold to extract heat generated by each of the cells.

10 Claims, 8 Drawing Sheets

(51) Int. Cl.

| | |
|---|---|
| ***H01M 10/617*** | (2014.01) |
| ***H01M 10/653*** | (2014.01) |
| ***H01M 10/6566*** | (2014.01) |
| ***H01M 10/6569*** | (2014.01) |
| ***H01M 10/659*** | (2014.01) |
| ***H01M 50/213*** | (2021.01) |
| ***H01M 50/289*** | (2021.01) |
| ***H01M 50/291*** | (2021.01) |

(52) U.S. Cl.
CPC ........ *H01M 10/613* (2015.04); *H01M 10/617* (2015.04); *H01M 10/653* (2015.04); *H01M 10/6566* (2015.04); *H01M 10/6569* (2015.04); *H01M 10/659* (2015.04); *H01M 50/289* (2021.01)

(58) Field of Classification Search
CPC ......... H01M 10/6552; H01M 10/6555; H01M 10/6556; H01M 10/6557; H01M 10/6565; H01M 10/6563; H01M 10/6566; H01M 10/6568; H01M 50/213; H01M 50/289; H01M 50/291
See application file for complete search history.

(56) References Cited

FOREIGN PATENT DOCUMENTS

| | | | |
|---|---|---|---|
| WO | WO2013134808 | * | 9/2013 |
| WO | 2019/125284 | A1 | 6/2019 |

OTHER PUBLICATIONS

Written Opinion issued in corresponding International Application No. PCT/IN2021/050400 mailed Aug. 23, 2021 (7 pages).

* cited by examiner

BATTERY MODULE WITH A CELL HOLDER ASSEMBLY

TECHNICAL FIELD

The present subject matter relates to a battery module. More particularly, it pertains to heat dissipation in the battery module.

BACKGROUND

In recent years, rechargeable energy storage devices have been widely used as an energy source for a number of electronic and electrical units, hybrid and electric vehicles. Commonly used rechargeable energy storage devices include, for example, nickel cadmium batteries, nickel hydrogen batteries, nickel zinc batteries, and lithium rechargeable batteries. Lithium rechargeable energy storage devices are widely used in electric and hybrid vehicles because they are rechargeable, they can be made in a compact size with large capacity, they have a high operation voltage, and they have a high energy density per unit weight.

An existing energy storage device comprises one or more energy storage cells, such as, lithium ion battery cells enclosed within a casing. The electrochemical reactions with the lithium ion battery cells are responsible for the voltage and the current generated by the energy storage device. Also, during charging of the energy storage device, electrochemical reactions occur within the lithium ion battery cells. These electrochemical reactions are highly exothermic and the lithium ion battery cells tend to heat up during the course of normal operation. The increased temperatures of the lithium ion battery cells degrade the electrical performance of the energy storage device and may lead to catastrophic failure of the energy storage devices.

The energy storage device comprising the lithium ion battery cells finds application as an energy source in electric vehicle or a hybrid electric vehicle. The energy storage device in the electric or hybrid electric vehicle requires cooling for continuous performance and durability with good health of the lithium ion battery cells. Range of the vehicle reduces due to temperature rise of the battery cells. There is probability of thermal runaway in the energy storage device, which may result in propagation of blasting of the cells. Further, charging immediately after riding/driving the vehicle may not be possible due to temperature rise in the battery module even by using fast charging chargers.

Thus, there is a need to effectively dissipate the generated heat and efficiently cool the lithium ion battery cells of the energy storage device for the safety and longevity of the energy storage device.

BRIEF DESCRIPTION OF DRAWINGS

The detailed description is described with reference to the accompanying figures. The same numbers are used throughout the drawings to reference like features and components.

DETAILED DESCRIPTION OF THE INVENTION

Figure 1:
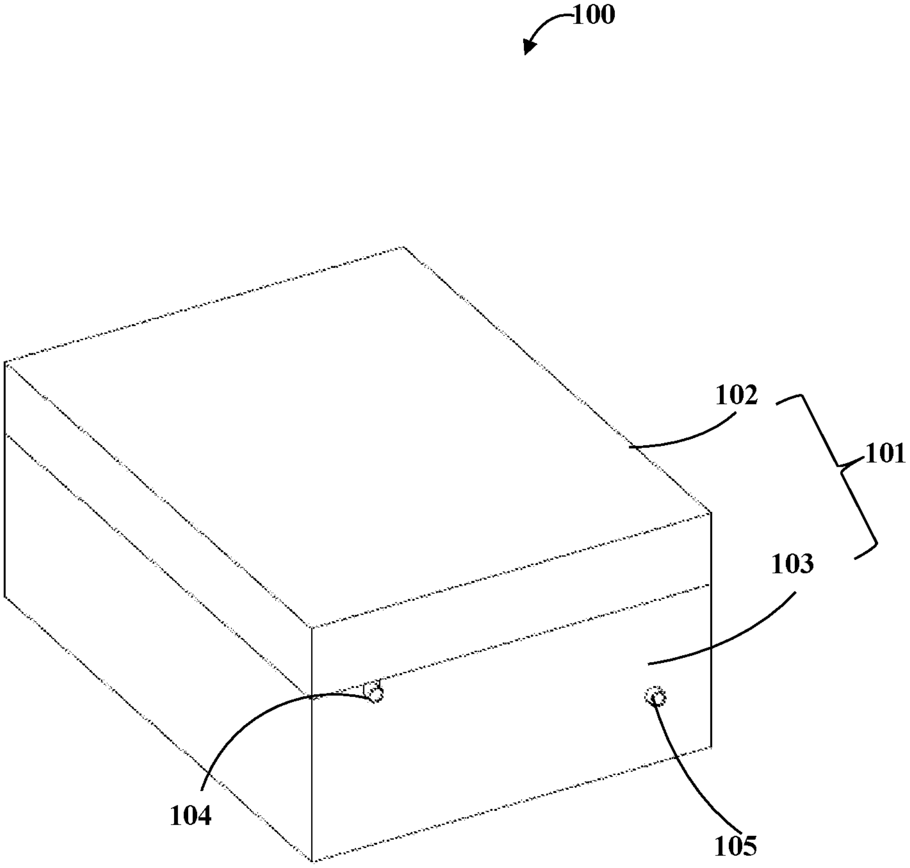
FIG. 1 exemplarily illustrates a top perspective view of a battery module, as per an embodiment of the present invention.

In an implementation for cooling of the energy storage device, and in turn the lithium ion battery cells, a heat exchange member in thermal contact with the casing of the energy storage device is used. The heat dissipated from the lithium ion battery cells has to traverse through air-filled gap between the cells and the casing. The heat transfer between the battery cells and the casing is not efficient since the air is a poor conductor of heat. In order to ensure that heat is effectively dissipated from the battery cells, it is essential to ensure that the heat generating battery cells are reliably secured to be in thermal contact with the heat exchange member proximal to the casing. Further, there is also a need to ensure that there is no air gap between an upper surface of the lithium ion battery cells and an inner surface of the outer casing, in order to ensure that heat is effectively transmitted to the metallic casing.

Currently, one of the implementations employs liquid cooling for thermal management in the energy storage device. The energy storage device as a whole may be immersed into a liquid coolant. However, the liquid coolant is stagnant and efficiency of cooling of the energy storage device is substantially less.

Another implementation of the energy storage device involves employing coolant tubes for a liquid coolant designed around individual battery cells or a cluster of battery cells in the energy storage device. However, insertion of modular coolant tubes within the casing of the energy storage devices makes the energy storage device bulky and no longer compact for space-constrained varied applications. The coolant tubes are to be made with a heat conductive material. Further, such an insert with coolant channels requires to be sealed efficiently, so as to prevent leakage of the liquid coolant into and outside the energy storage device.

Therefore, there exists a need for an improved design of an energy storage device that is light in weight with efficient and effective heat transfer from the battery cells which additionally provides ease and safety during assembly, use, maintenance, and servicing of the energy storage device overcoming all problems disclosed above as well as other problems of known art.

The present subject matter discloses an energy storage device, that is, a battery module with battery cells surrounded by a liquid coolant for effectively as well as efficiently dissipating the heat generated by the battery cells and cooling the battery cells for safety, longevity, and ease and safety during assembly, use, maintenance, and servicing of the energy storage device. Such a battery module may be employed in powered devices, such as, electronic gadgets, laptops, toys, vehicles, for example, electric vehicle, hybrid electric vehicles, IC engine vehicles, etc.

In an embodiment of the present invention, a battery module for a powered device is disclosed. The battery module comprises a casing comprising a top cover and a bottom cover. Multiple cells are positioned between the top cover and the bottom cover. Further, the battery module comprises a cell holder assembly comprising cell holders for holding the plurality of cells. The cell holder assembly comprises an inlet manifold and an outlet manifold for a coolant to flow through the cell holders for extracting heat generated by the cells. Each of the cell holders holds a cell. Each of the cell holders comprises an opening for the coolant to flow around cells in the each of the cell holders. The coolant flows from the inlet manifold in the cell holder assembly through the openings in the cell holders sequentially located in the cell holder assembly. It extracts heat from the cells in the cell holders, and exits through the outlet manifold in the cell holder assembly.

In an embodiment, the opening of each of the cell holders is formed proximal to a bottom location or a top location of the cell holder. In an embodiment, consecutive cell holders of the cell holder assembly comprise the opening at the bottom location and the top location for the coolant to raise from bottom to top in each of the consecutive cell holders. The opening is formed in a common partition wall between consecutive cell holders. In an embodiment, a packaging member is positioned at a collar region proximal to each end of each of the cells, for sealing the coolant at the ends of each of the cells. In an embodiment, an interconnect sheet is in contact with each end of each cell. In embodiment, the cell holder assembly comprises a cell holder locking member with openings positioned at each end of the cell holders of the cell holder assembly. In an embodiment, the packaging member is abuttingly disposed in the cell locking member. In an embodiment, the packaging member is integrally formed in the cell locking member. In an embodiment, the inlet manifold and the outlet manifold are at one of same elevation and different elevations. The outlet manifold extending from an outlet opening of the bottom cover is communicatively connected to a radiator for effective cooling of the coolant.

Another embodiment of a method of assembly of a battery module is disclosed. The method comprises the steps of: obtaining multiple cells, positioning the cells in cell holders of a cell holder assembly, sealing each end of each of the cells in the cell holders with a packaging member, and positioning a casing with openings for the inlet manifold and the outlet manifold enclosing the cell holder assembly to obtain the battery module.

In an embodiment, positioning the cells in the cell holders of a cell holder assembly comprises the steps of: positioning each cell in each cell holder of the cell holder assembly, and positioning a cell holder locking member with openings at each end of each cell. In an embodiment, the packaging member is abuttingly disposed in the cell locking member. In an embodiment, the method further comprises a step of positioning an interconnect sheet in contact with each end of the each of the plurality of cells. The cell holder assembly comprises an inlet manifold and an outlet manifold for a coolant to flow through the cell holders for extracting heat generated by the cells. In an embodiment, in the battery module assembled by said method, each of the cell holders of the cell holder assembly of the battery module comprises an opening for the coolant to flow around a cell in the each of the cell holders. The opening of each of the cell holders is formed proximal to a bottom location and a top location of the each of the cell holders, consecutive cell holders of the cell holder assembly comprise the opening at the bottom location and the top location for the coolant to raise from bottom to top in each of the consecutive cell holders, and the opening is formed in a common partition wall between consecutive cell holders.

In another embodiment, a cell holder assembly for holding a plurality of cells is disclosed. The cell holder assembly comprises a placeholder assembly comprising a plurality of cell holders enclosing the plurality of cells; a cell locking member, with openings, positioned at each end of the cell holders; and an opening in each of the cell holders for a coolant to flow around one of the plurality of cells in the each of the cell holders. An inner circumference of the each of the cell holders is of circular cross-section and an outer circumference of the each of the cell holders is of a geometrical shape. The opening of each of the cell holders is formed proximal to one of a bottom location and a top location of the each of the cell holders. consecutive cell holders of the cell holder assembly comprise the opening at the bottom location and the top location for the coolant to raise from bottom to top in each of the consecutive cell holders, and the opening is formed in a common partition wall between the consecutive cell holders.

A packaging member is positioned proximal to each end of each of the plurality of cells for sealing the coolant at the ends of the each of the plurality of cells. In an embodiment, the packaging member is abuttingly disposed in the cell holder locking member. In another embodiment, the packaging member is integrated with the placeholder assembly. the packaging member of C cross section profile sit in a groove at a collar region proximal to the ends of the each of the plurality of cells to form a sealing joint. the cell locking member has a complimentary holding groove profile to enable press fit of the cell locking member onto ends of the placeholder assembly. In an embodiment, the cell locking member is integrated with the placeholder assembly.

FIG. 1 exemplarily illustrates a top perspective view of a battery module 100, as per an embodiment of the present invention. As exemplarily illustrated in FIG. 1, the battery module 100 comprises a casing 101. The casing 101 comprises a top cover 102 and a bottom cover 103. The casing 101 encloses multiple cells and other electrical and electronic components, such as, a battery management system (BMS) board of the battery module 100. The bottom cover 103 further comprises an inlet opening 104 and an outlet opening 105 for a liquid coolant to flow around the enclosed cells. As exemplarily illustrated, the inlet opening 104 and the outlet opening 105 are at different elevations. That is, the inlet opening 104 is provided at a higher elevation compared to the outlet opening 105. In an alternate embodiment, the inlet opening 104 and the outlet opening 105 are at the same elevation. The inlet opening 104 and the outlet opening 105 are openings on the bottom cover 103 through which an inlet manifold and an outlet manifold extend from a cell holder assembly of the battery module 100. The bottom cover 103 is a hollow container into which the cells are positioned. The top cover 102 acts as a lid to close the bottom cover 103. The top cover 102 and the bottom cover 103 protect the cells from external factors & environment like water and dust entry. The casing 101, further to the inlet opening 104 and the outlet opening 105, may comprise external electrical connections (not shown) of the battery module 100 for charging and discharging of the battery module 100.

Figure 2:
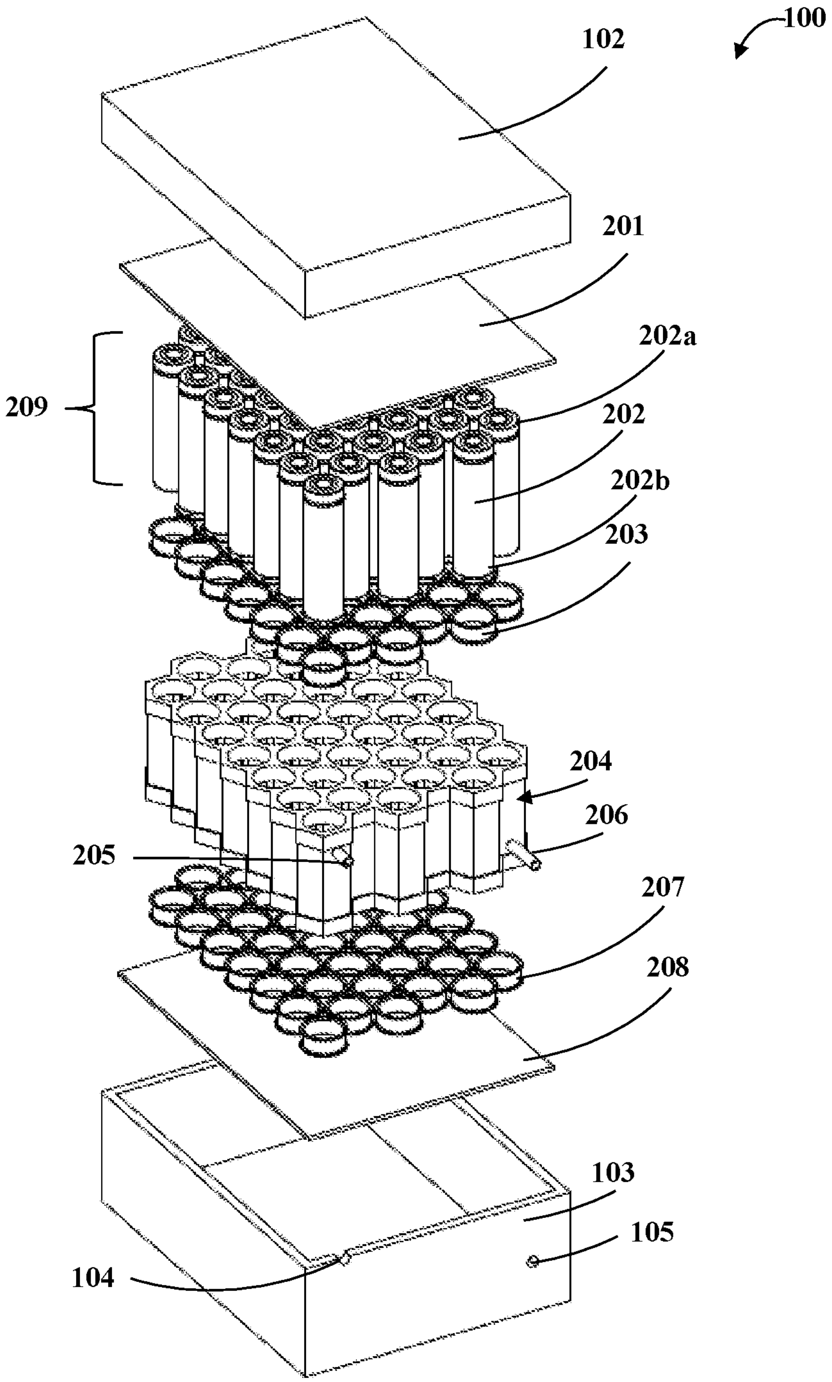
FIG. 2 exemplarily illustrates an exploded perspective view of the battery module illustrated in FIG. 1.

FIG. 2 exemplarily illustrates an exploded perspective view of the battery module 100 illustrated in FIG. 1. As exemplarily illustrated, the battery module 100 comprises the top cover 102, the bottom cover 103, multiple cells 209, and a cell holder assembly 204. The cells 209 are disposed in the cell holder assembly 204. The cells 209 are cylindrical in shape as exemplarily illustrated. In an embodiment, the cells 209 may be rectangular, hexagonal, etc., in shape. The top cover 102 and the bottom cover 103 enclose the cells 209 in the cell holder assembly 204. The cells 209 are arranged in a predetermined sequence in the cell holder assembly 204. The cell holder assembly 204 comprises the inlet manifold 205 and the outlet manifold 206. The inlet manifold 205 and the outlet manifold 206 extend from the inlet opening 104 and the outlet opening 105 of the bottom cover 103. The cells 209 are electrically connected in series and/or parallel configuration to form an array of cells using one or more interconnect sheets, such as, 201 and 208. The ends 202*a* and 202*b* of each cell 202, identified as electrical terminals of the cell 202 are in contact with the interconnect sheets 201 and 208. The interconnect sheets 201 and 208 connect the cells 209 in series and/or parallel combination to deliver the desired current and voltage of the battery module 100. In an embodiment, such arrays of cells 209 are electrically connected to the BMS (not shown) within the battery module 100. Packaging members 203 and 207 are positioned at the ends of the cell 202*a* and 202*b* such that the packaging members are proximal to the electrical terminals. As per an aspect of the present invention, the packing members 203 & 207 act as coolant sealants for the cell holder 204 to hold the coolant effectively during usage of the battery module 100.

The coolant flows from the inlet manifold 205 in the cell holder assembly 204 towards the outlet manifold 206. The coolant extracts heat generated by the cells 209 in the cell holder assembly 204. The coolant is a liquid coolant. In an embodiment, the coolant may be a phase changing material that changes phase at elevated temperatures and solidifies at lower temperatures. The inlet manifold 205 and the outlet manifold 206 extends from the cell holder assembly 204 through the inlet opening 104 and the outlet opening 105 respectively, external to the battery module 100. In an additional embodiment, the outlet manifold 206 extending from the outlet opening 105 of the bottom cover 103 is connected to a radiator. At the radiator, the heated coolant from the outlet manifold 206 is cooled and stored in a reservoir for using in next cycle of extraction of heat from the cells 209. The reservoir may be connected to the inlet manifold 205 extending from the inlet opening 104 of the bottom cover 103.

Figure 3:
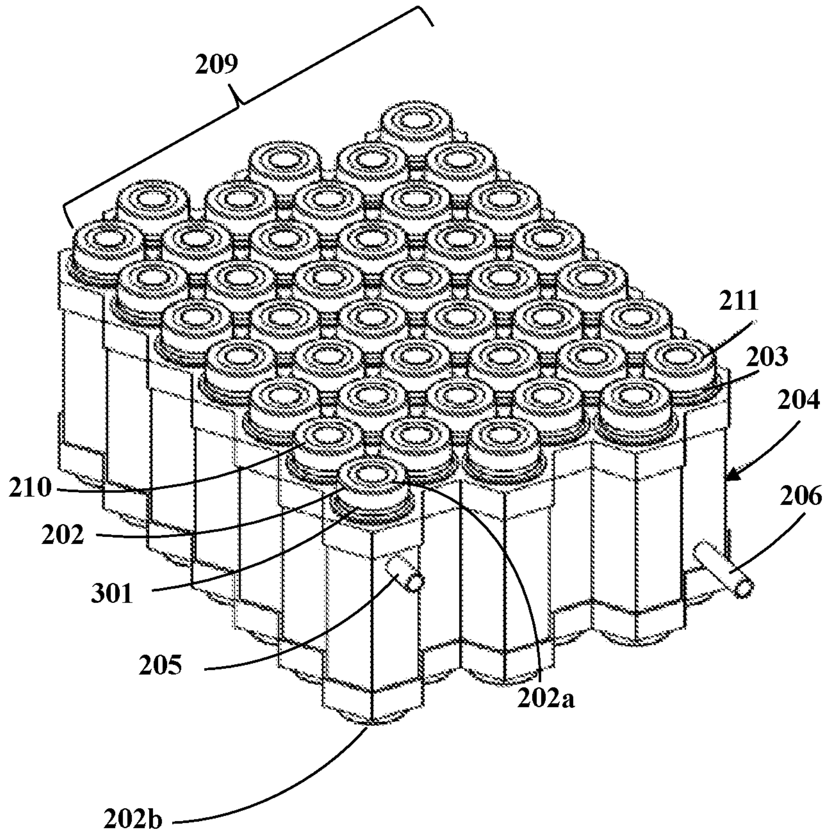
FIG. 3 exemplarily illustrates a top perspective view of a cell holder assembly holding cells of the battery module as exemplarily illustrated in FIG. 2.

FIG. 3 exemplarily illustrates a top perspective view of the cell holder assembly 204 holding the cells 209 of the battery module 100 as exemplarily illustrated in FIG. 2. The cell holder assembly 204 comprises cell holders, such as, 301 for holding the cells 209. As disclosed earlier, the coolant flows through the inlet manifold 205, fills up the circumferential space surrounding the cells 209 in the cell holder 204, and exits from the outlet manifold 206. The coolant flows from the cell holder 301 of a cell, such as, 202 to the cell holder of another cell 210, and passes further sequentially till the cell 211 and exits from the outlet manifold 206. The packaging member, such as, 203 seals the cell holder 301 at a collar portion of each of the cells, such as, 202 to prevent leaking of the coolant from the collar portion at the top and bottom of the cell holder 301.

Figure 4:
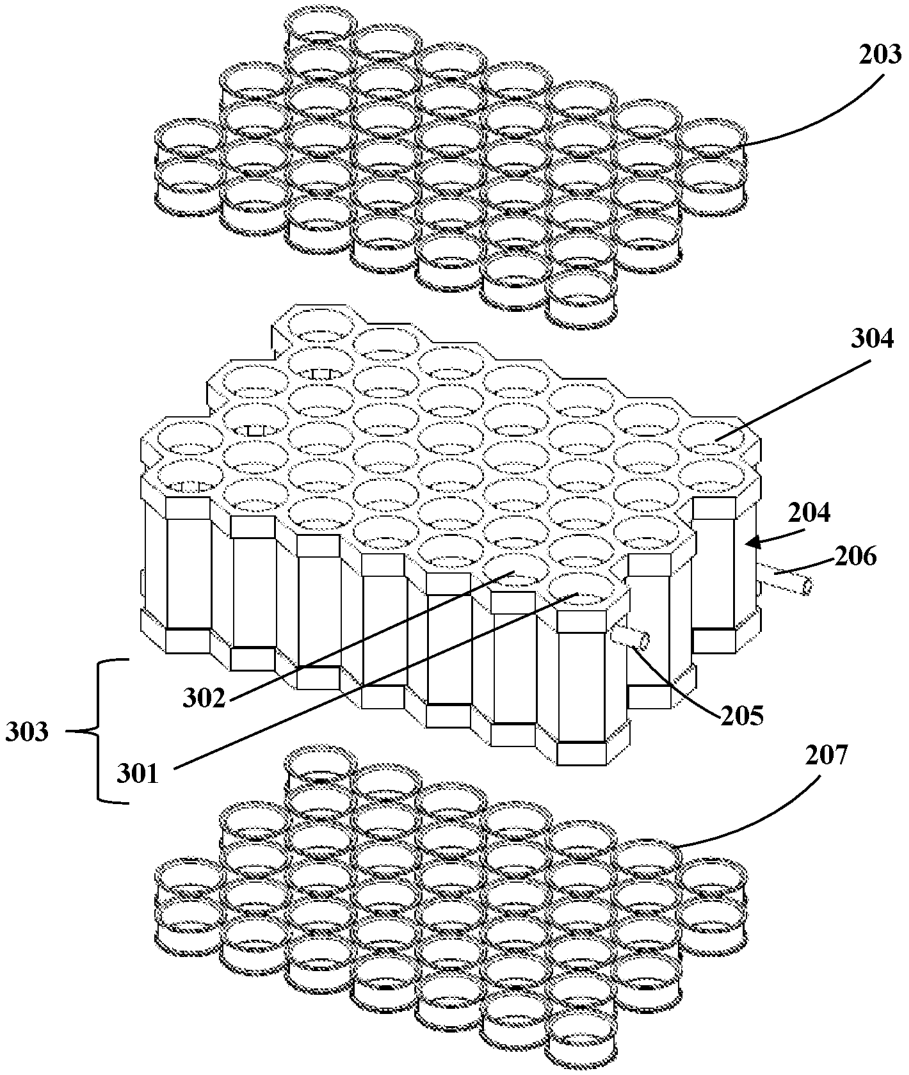
FIG. 4 exemplarily illustrates a partial exploded view of the cell holder assembly showing packaging members positioned in each of the cell holders.

FIG. 4 exemplarily illustrates a partial exploded view of the cell holder assembly 204 showing the packaging members 203 and 207 positioned in each of the individual cell holders, such as, 301. The cell holders, such as, 301, 302, 304 together form a placeholder assembly 303. As exemplarily illustrated, the cell holder 301 is a hollow tubular structure that is open on both ends (not shown). The open ends allow the insertion of the cell, such as, 202 into it. As per an embodiment, the cell holder 301 is hexagonal in shape on the outer periphery & circular in the inner periphery. In an embodiment, the cell holder 301 may be of cylindrical or rectangular cross-section. The inlet manifold 205 extends from the first cell holder 301 and the outlet manifold 206 extends from the last cell holder 304. The coolant flows from the first cell holder 301 towards the last cell holder 304 in the cell holder assembly 204. A packaging member 203 and 207 is positioned proximal to the ends of each of the cell holders, such as, 301. The packaging members 203 and 207 are positioned at a collar portion of the ends 202*a* and 202*b*. Once, the cell, such as, 202 is inserted into the cell holder 301, a pocket or an empty space is formed around the cell 202 in the cell holder 301. The cells 209 are cylindrical in shape as exemplarily illustrated in FIG. 2 and the cell holder 301 is hexagonal in shape. The coolant fills the pocket in the cell holder 301. The ends 202*a* and 202*b* of the cells 209 protrude from the open ends of the cell holder 301. A collar region of the cell holder 301 proximal to the ends 202*a* and 202*b* of the cell 202 are sealed using the packaging members 203 and 207. The packaging members 203 and 207 seal the gap between the external surface of the cell 202 at the collar region proximal to the ends 202*a* and 202*b* and the cell holder 301. The coolant filled in the pocket is sealed from leaking at the ends by press fit seal joint formed at the collar region of the cells, i.e. 202*a* and 202*b* of the cells 209. In an embodiment, the packaging members 203 and 207 are elastic gaskets of C cross section profile, that sit in a groove formed at the collar region proximal to the ends 202*a* and 202*b* of the cell 202. In an embodiment, the packaging members 203 and 207 are O-ring gaskets. The packaging members 203 and 207 also arrest movement of the cell 202 in the cell holder 301 due to the flow of the coolant by holding the cell 202 tight in the cell holder 301.

Figure 5:
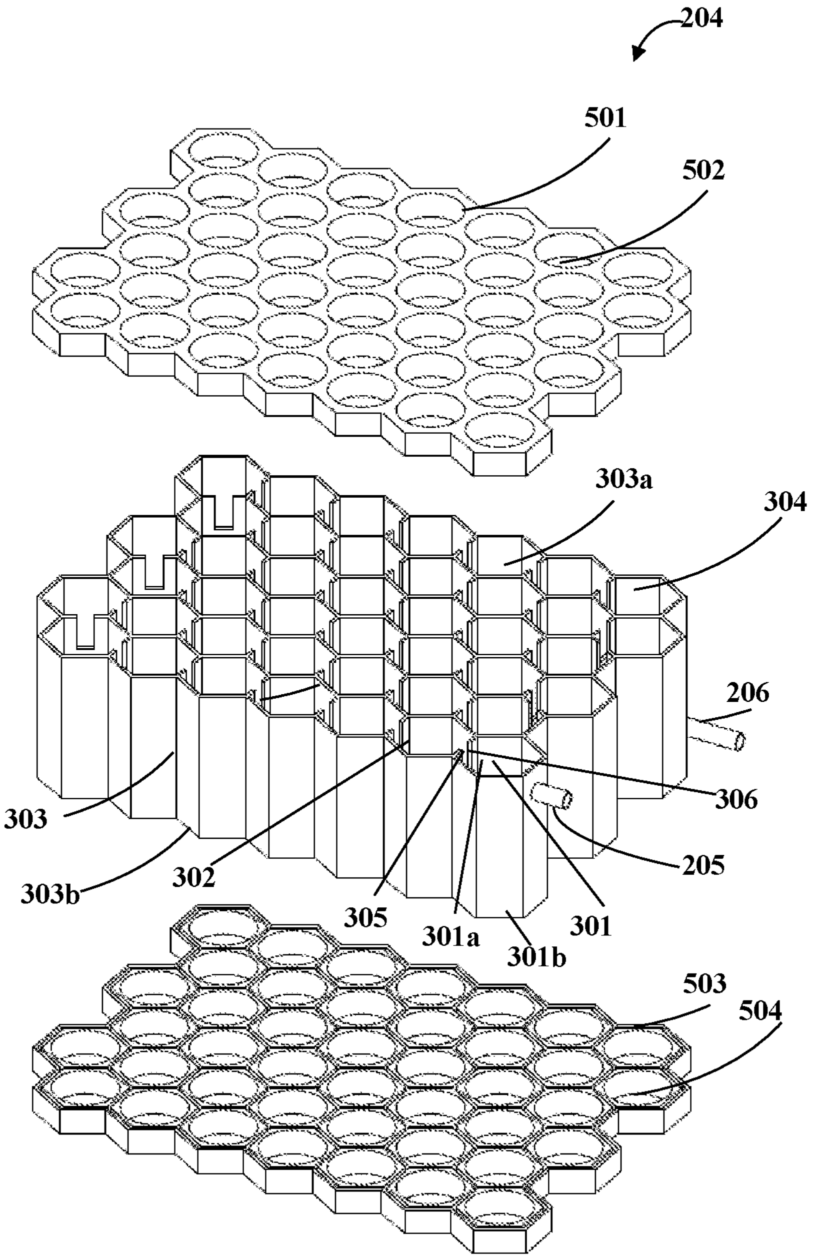
FIG. 5 exemplarily illustrates an exploded view of the cell holder assembly of the battery module illustrated in FIG. 2.

FIG. 5 exemplarily illustrates an exploded view of the cell holder assembly 204 of the battery module 100 illustrated in FIG. 2. The cell holder assembly 204 comprises the placeholder assembly 303 with cell locking members 501 and 503 at open ends 303*a* and 303*b* of the placeholder assembly 303. The open ends 301*a* and 301*b* of the cell holder, such as, 301 together form the open ends 303*a* and 303*b* of the placeholder assembly 303. The inlet manifold 205 and the outlet manifold 206 extend from the first cell holder 301 and the last cell holder 304 of the placeholder assembly 303, respectively. In an embodiment, the cell locking members 501 and 503 may house the packaging members 203 and 207, respectively. In an embodiment, the cell locking members 501 and 503 are screwed or snap-fit to the open ends 303*a* and 303*b* of the placeholder assembly 303. The cell locking member 501 and 503 is a plate structure of a predetermined thickness with openings, such as, 502 and 504 respectively to accommodate the ends 202*a* and 202*b* of the cells, such as, 202. The external profile of the cell locking members 501 and 503 matches the external profile of the placeholder assembly 303. As per an aspect of the present invention, the cell locking member 501 and 503 have a complimentary holding groove profile to enable press fit or self-alignment of the cell locking members 501, 503 onto the placeholder assembly 303. Such hexagonal shape of the placeholder assembly 303 and the cell locking members 501, 503 has advantages, such as, stable & secure joint, good mechanical properties and easy manufacturing. The hexagonal shape of the cell holder 301, 302, 304 offers more room for the coolant in common pitch distance than the circular shape of cell holder 301, 302, 304. The cell holder assembly 204, when viewed from the top, replicates a honeycomb structure. In an embodiment, the packaging members 203 and 207 are integral part of the circular cut-outs 502 and 504 in the cell locking members 501 and 503 and thus, does not require the packaging members 203 and 207 to be inserted separately at the ends 202*a* and 202*b* of the cells 202 in the cell holder 301. In another embodiment, the cell locking members 501, 503 and the packing members 203, 207 are integral part of the cell holder assembly 204.

From the inlet manifold 205, the coolant fills the first cell holder 301 surrounding the cell, such as, 202 in the first cell holder 301. The first cell holder 301 and the second cell holder 302 are consecutive cell holders. The first cell holder 301 and the second cell holder 302 share a common partition wall 305. The common partition wall 305 comprises an opening 306 for the coolant to flow from the first cell holder 301 to the second cell holder 302. The coolant now fills the pocket in the second cell holder 302 and flows further into the consecutive cell holder through the opening in the common partition wall of the cell holder. As per an embodiment, the opening 306 in the common partition wall 305 is formed proximal to a bottom location or a top location of the cell holder 301. That is, the opening 306 is formed in the common partition wall 305 at a location proximal to one of the ends 301*a* and 301*b* of the cell holder 301. In an embodiment, the opening 306 is formed in the common partition wall 305 centrally. The consecutive cell holders 301 and 302 have the opening 306 at the bottom location or the top location for the coolant to raise from the bottom to top in the pocket between the cell 202 and the walls of the cell holder 301.

Figure 6A:
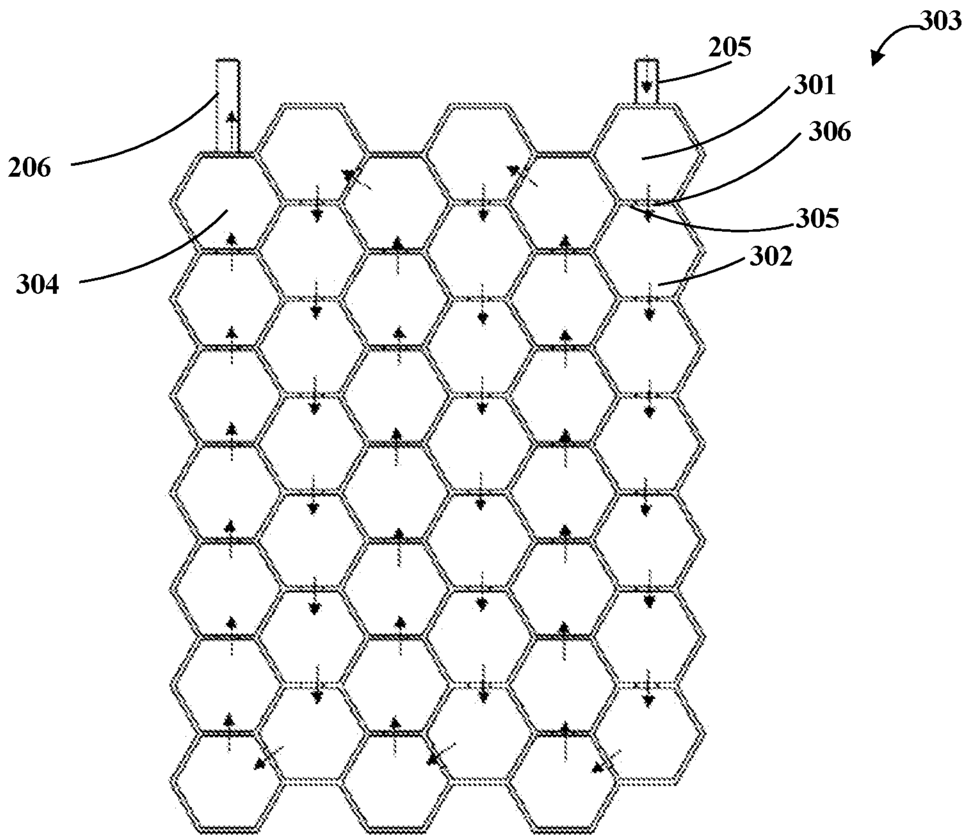
FIGS. 6A-6B exemplarily illustrate a plan view and sectional view of the placeholder assembly showing flow path of the coolant from an inlet manifold to an outlet manifold.
Figure 6B:
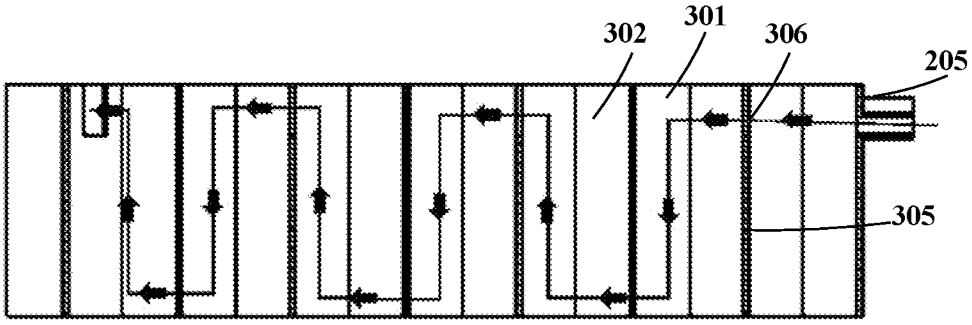

FIGS. 6A-6B exemplarily illustrate a plan view and sectional view of the placeholder assembly 303 showing flow path of the coolant from the inlet manifold 205 to the outlet manifold 206. As exemplarily illustrated in FIG. 6A, the placeholder assembly 303 is divided into even number of rows, such as, six rows of cell holders, such as, 301, 302, 304. Each row of the cell holders witnesses the flow of coolant in one direction. In the alternate rows, the directions of flow of the coolant is opposite. The opposite direction of flow of the coolant in the alternate rows is due to design of the opening 306 in the common partition wall 305 between the cell holders. The flow of coolant in the cell holders is in the direction as illustrated in FIG. 6A with arrows. The coolant reaches the cell holder 304 and exits from the outlet manifold 206. It can be seen that various permutations & combination of flow path can be designed to achieve an optimal cooling of the cells 209.

In FIG. 6B, the flow path of the coolant in the first row of the cell holders of the placeholder assembly 303. As illustrated, the coolant flows through the inlet manifold 205 into the cell holder 301 at a top location, fills the pocket of the cell holder 301, and exits from the cell holder 301 through an opening 306 at a bottom location of common partition wall 305 of the cell holder 301. In the cell holder 302, the coolant raises from bottom to top in the pocket and exits the cell holder 302 from the opening at a bottom location to the subsequent cell holder.

Figure 7:
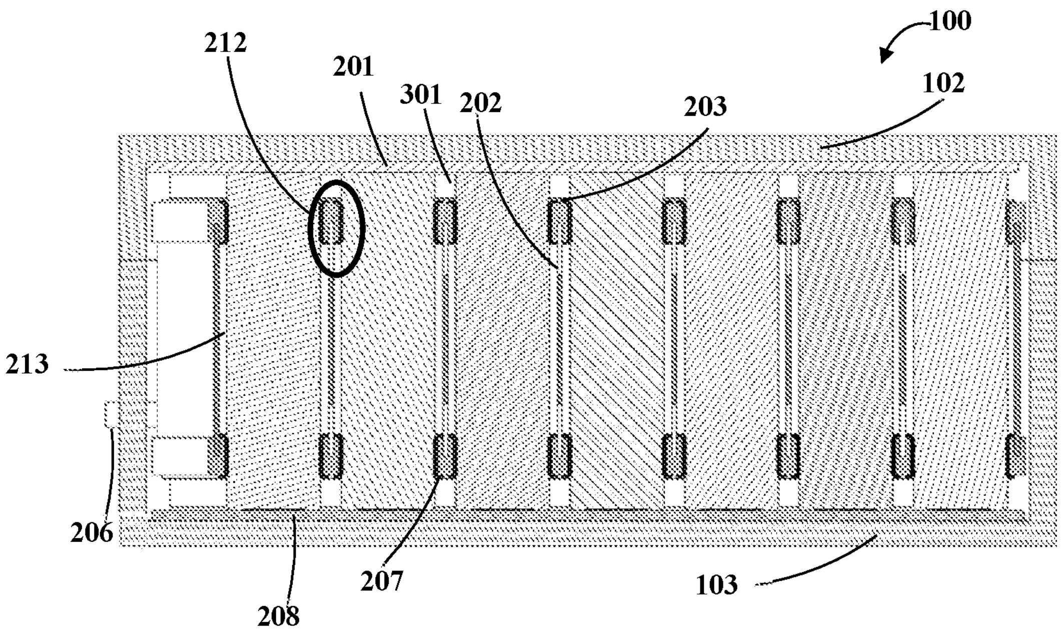
FIG. 7 exemplarily illustrates a sectional view of the battery module.

FIG. 7 exemplarily illustrates a sectional view of the battery module 100. As exemplarily illustrated, the cells 209 are positioned between the top cover 102 and the bottom cover 103. The cells 209 are located in the cell holder assembly 204. The packaging members 203 and 207 are positioned at collar region 212 proximal to the ends 202*a* and 202*b* of the cell 202 held in the cell holder assembly 204. The collar region 212 of the cell holder 301 holds the packaging member 203 and 207, which in turn holds the cell 202 in a tight fit assembly to form a sealing. The packaging member 203 and 207 has the C shape cross section profile that abuttingly protrudes inside as well as outside of the collar region 212 of the cell holder 301 & the mid portion of the packaging member 203 and 207 abuttingly holds the outer circumference of each respective cell 202 while the outer circumference of the packaging member 203 and 207 abuts the inner circumference of the collar region 212 of the cell holder 301. The coolant surrounds each cell 202 in the cell holder assembly 204 in the pocket 213. The packaging members 203 and 207 seal the coolant from flowing out of the cell holder assembly 204. The coolant passes from one cell, such as 202 to another cell in the cell holder assembly 204 extracting heat from each of the cells 209 and exits from the outlet manifold 206 in the cell holder assembly 204. The electrical terminals of the cells 209 contact the interconnect sheets 201 and 208.

Figure 8:
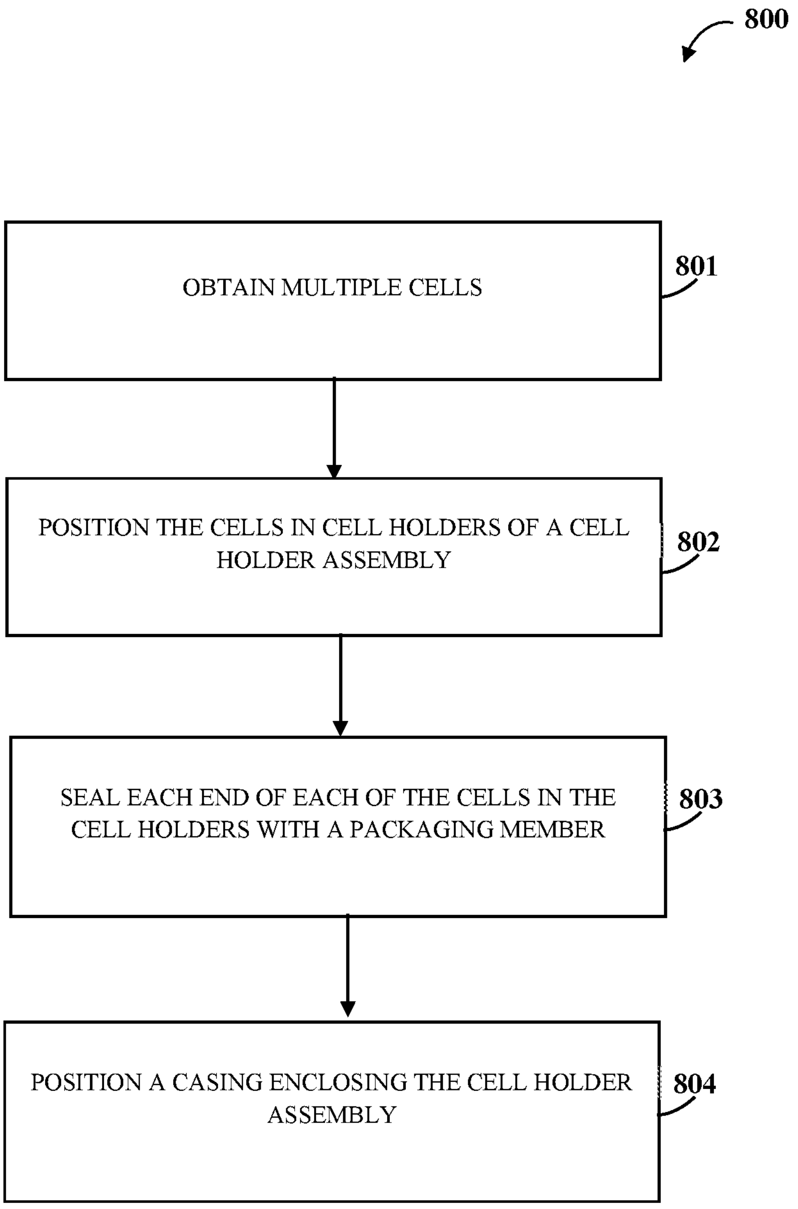
FIG. 8 exemplarily illustrates a flowchart depicting a method comprising steps for assembly of the battery module exemplarily illustrated in FIG. 2.

FIG. 8 exemplarily illustrates a flowchart 800 depicting a method comprising steps for assembly of the battery module 100 exemplarily illustrated in FIG. 2. The method comprises: at step 801, obtaining or organising multiple cells 209. At step 802, the cells 209 are positioned in cell holders, such as, 301 of a cell holder assembly 204. The cell holder assembly 204 comprises an inlet manifold 205 and an outlet manifold 206 for a coolant to flow through the cell holders, such as, 301 for extracting heat generated by the cells. 209 At step 803, each end of each of the cells 209 in the cell holders, such as, 301 is sealed with a packaging member, such as, 203 and 207. Further, at step 804, a casing 101, with openings 104 and 105 for the inlet manifold 205 and the outlet manifold 206, is positioned to enclose the cell holder assembly 204 to obtain the battery module 100.

The different embodiments of the battery modules with the coolant extracting the heat from the cells in the cell holder assembly provides technical advancements in the field of heat management in battery modules. The battery module uses the cell holders for containing the coolant and making it flow further towards the outlet manifold. The extraneous infrastructure of coolant channels around the cells is avoided, thus making the battery module lighter in weight, easy to assemble, maintain, and replace. Also, the difference in the elevation of the inlet manifold and the outlet manifold in the cell holder assembly ensures the coolant is pushed further in the sequentially arranged cell holders, avoiding an external pumping force to push the coolant. The coolant is in direct contact with the cell in the cell holder extracting heat by convection steadily. The efforts of packaging of the components of the battery module to ensure efficient cooling by coolant outside the casing, such as, in immersion cooling are avoided. Heat is extracted from each of the cells, thereby maintaining the temperature of the cells at a desired temperature for longevity of the battery module.

The packaging member at the ends of the cells arrests the flow of the coolant outside the cell holder. The packaging member contracts or expands to efficiently the pack the gap between the cell and the wall of the cell holder. The packaging member prevents the contact of the coolant with the terminals of the cells. Also, the coolant is preferred to be a thermally conductive and electrically insulating in nature. The coolant may be a free-flowing liquid or a phase changing material that is chemically non-reactive with the cell holders for the longevity of the battery module.

Such an assembly of the battery module ensures effective heat transfer between the cells and the coolant. The heat dissipated effectively ensures thermal stability and durability of the battery module. The intact tight packaging of the cells in the cell holder assembly makes the battery module mechanically stable, impact resistant, and vibration proof. The resilient nature of the packaging member acts as a vibration absorber that is experienced by the cells of the battery module.

Improvements and modifications may be incorporated herein without deviating from the scope of the invention.

We claim:

1. A battery module for a powered device, the battery module comprising:

a casing comprising a top cover and a bottom cover;

cells disposed between the top cover and the bottom cover; and a cell holder assembly comprising cell holders that accommodate the cells, wherein the cell holder assembly comprises an inlet manifold and an outlet manifold that enable a coolant to flow through the cell holders sequentially from the inlet manifold to the outlet manifold to extract heat generated by each of the cells, and the outlet manifold extending from an outlet opening of the bottom cover is connected to a radiator, and at the radiator, heated coolant from the outlet manifold is cooled and stored in a reservoir for using in a next cycle of extraction of heat from the cells;

wherein:

each cell holder comprises an opening at a bottom location and a top location to enable the coolant to rise from bottom to top in each of a plurality of consecutive cell holders, a packaging member is disposed at a collar region at each end of each of the cells, the packaging member seals the coolant at the ends of each of the cells to hold the coolant during usage of the battery module, the coolant being a phase changing material capable of changing phase in response to heat generated by the cells and to solidify upon reduction in temperature.

2. The battery module as claimed in claim 1, wherein each of the plurality of the consecutive cell holders holds a single cell of the cells.

3. The battery module as claimed in claim 1, wherein each of the plurality of the consecutive cell holders comprises an opening for the coolant to flow around one cell of the cells in each of the cell holders.

4. The battery module as claimed in claim 3, wherein the opening of each of the plurality of the consecutive cell holders is disposed at one of a bottom location and a top location of each of the cell holders.

5. The battery module as claimed in claim 3, wherein the opening is disposed on a common partition wall between the plurality of the consecutive cell holders.

6. The battery module as claimed in claim 1, wherein the coolant flowing from the inlet manifold into the cell holder assembly through openings in the plurality of the consecutive cell holders, the plurality of the consecutive cell holders are sequentially located in the cell holder assembly, and the coolant extracts heat from the cells in the plurality of the consecutive cell holders, and the coolant flowing out through the outlet manifold of the cell holder assembly.

7. The battery module as claimed in claim 1, wherein the cell holder assembly comprises a cell locking member configured with openings, disposed at each end of the plurality of the consecutive cell holders of the cell holder assembly.

8. The battery module as claimed claim 7, wherein the packaging member is abuttingly disposed in the cell locking member.

9. The battery module as claimed in claim 7, wherein the packaging member is integrally formed in the cell locking member.

10. The battery module as claimed in claim 1, wherein the inlet manifold and the outlet manifold are disposed at one of a same elevation and a different elevation.

* * * * *